United States Patent
Han et al.

(10) Patent No.: US 11,647,223 B2
(45) Date of Patent: May 9, 2023

(54) DYNAMIC MOTION VECTOR REFERENCING FOR VIDEO CODING

(71) Applicant: GOOGLE LLC, Mountain View, CA (US)

(72) Inventors: Jingning Han, Santa Clara, CA (US); James Bankoski, Los Gatos, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 78 days.

(21) Appl. No.: 17/132,065

(22) Filed: Dec. 23, 2020

(65) Prior Publication Data

US 2021/0112270 A1    Apr. 15, 2021

Related U.S. Application Data

(63) Continuation of application No. 15/677,220, filed on Aug. 15, 2017, now Pat. No. 10,880,573.

(51) Int. Cl.
*H04N 19/00* (2014.01)
*H04N 19/573* (2014.01)
(Continued)

(52) U.S. Cl.
CPC .......... *H04N 19/573* (2014.11); *H04N 19/52* (2014.11); *H04N 19/567* (2014.11); *H04N 19/70* (2014.11)

(58) Field of Classification Search
CPC ..................................................... H04N 19/00
See application file for complete search history.

(56) References Cited

U.S. PATENT DOCUMENTS 6,735,249 B1   5/2004  Karczewicz et al.
6,816,552 B2   11/2004 Demos
(Continued)

FOREIGN PATENT DOCUMENTS

EP   3059965 A1   8/2016
EP   3139611 A1   3/2017
(Continued)

OTHER PUBLICATIONS

Bankoski, et al., "Technical Overview of VP8, An Open Source Video Codec for the Web", Jul. 11, 2011, 6 pp.
(Continued)

*Primary Examiner* — Maryam A Nasri
(74) *Attorney, Agent, or Firm* — Young Basile Hanlon & MacFarlane, P.C.

(57) ABSTRACT

Dynamic motion vector referencing is used to predict motion within video blocks. A motion trajectory is determined for a current frame including a video block to encode or decode based on a reference motion vector used for encoding or decoding one or more reference frames of the current frame. One or more temporal motion vector candidates are then determined for predicting motion within the video block based on the motion trajectory. A motion vector is selected from a motion vector candidate list including the one or more temporal motion vector candidates and used to generate a prediction block. The prediction block is then used to encode or decode the video block. The motion trajectory is based on an order of video frames indicated by frame offset values encoded to a bitstream. The motion vector candidate list may include one or more spatial motion vector candidates.

20 Claims, 9 Drawing Sheets

(51) Int. Cl.
  *H04N 19/70*   (2014.01)
  *H04N 19/567*  (2014.01)
  *H04N 19/52*   (2014.01)

(56) References Cited

U.S. PATENT DOCUMENTS

| | | | |
|---|---|---|---|
| 7,149,251 | B2 | 12/2006 | Karczewicz et al. |
| 7,266,150 | B2 | 9/2007 | Demos |
| 7,308,145 | B2 | 12/2007 | Abe et al. |
| 7,492,952 | B2 | 2/2009 | Abe et al. |
| 7,606,307 | B2 | 10/2009 | Jeon |
| 7,894,524 | B2 | 2/2011 | Demos |
| 8,050,323 | B2 | 11/2011 | Demos |
| 8,111,754 | B1 | 2/2012 | Demos |
| 8,139,638 | B2 | 3/2012 | Demos |
| 8,139,639 | B2 | 3/2012 | Demos |
| 8,139,640 | B2 | 3/2012 | Demos |
| 8,139,641 | B2 | 3/2012 | Demos |
| 8,144,774 | B2 | 3/2012 | Demos |
| 8,149,912 | B2 | 4/2012 | Demos |
| 8,155,200 | B2 | 4/2012 | Kondo et al. |
| 8,155,201 | B2 | 4/2012 | Kondo et al. |
| 8,160,142 | B2 | 4/2012 | Demos |
| 8,160,149 | B2 | 4/2012 | Demos |
| 8,213,507 | B2 | 7/2012 | Demos |
| 8,249,158 | B2 | 8/2012 | Demos |
| 8,279,929 | B2 | 10/2012 | Demos |
| 8,290,043 | B2 | 10/2012 | Demos |
| 8,325,809 | B2 | 12/2012 | Demos |
| 8,351,503 | B2 | 1/2013 | Jeon |
| 8,401,078 | B2 | 3/2013 | Demos |
| 8,477,851 | B2 | 7/2013 | Demos |
| 8,488,674 | B2 | 7/2013 | Demos |
| 8,503,529 | B2 | 8/2013 | Demos |
| 8,654,835 | B2 | 2/2014 | Li et al. |
| 8,699,572 | B2 | 4/2014 | Demos |
| 8,761,257 | B2 | 6/2014 | Demos |
| 8,767,829 | B2 | 7/2014 | Demos |
| 8,873,629 | B2 | 10/2014 | Demos |
| 8,942,285 | B2 | 1/2015 | Demos |
| 8,995,528 | B2 | 3/2015 | Demos |
| 9,078,002 | B2 | 7/2015 | Demos |
| 9,386,321 | B2 | 7/2016 | Demos |
| 9,538,196 | B2 | 1/2017 | Kadono et al. |
| 2009/0148058 | A1* | 6/2009 | Dane .............. H04N 19/61 382/251 |
| 2010/0166079 | A1 | 7/2010 | Goel |
| 2014/0092978 | A1 | 4/2014 | Bugdayci et al. |
| 2015/0181220 | A1* | 6/2015 | Sugio ............... H04N 19/107 375/240.16 |
| 2020/0084457 | A1 | 3/2020 | Abe et al. |

FOREIGN PATENT DOCUMENTS

| | | |
|---|---|---|
| GB | 2488815 A | 9/2012 |
| WO | 2013/159038 A1 | 10/2013 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

U.S. Appl. No. 15/677,220, filed Aug. 15, 2017.

International Search Report and Written Opinion in PCT/US2018/032599, dated Jul. 23, 2018, 14 pgs.

* cited by examiner

| CODING ORDER | FRAME INDEX | PACKET STAMPS | FRAME OFFSET VALUE |
|---|---|---|---|
| 1 | 1 | 1 | 0 |
| 2 | 8 | 2 | 6 |
| 3 | 5 | 2 | 3 |
| 4 | 3 | 2 | 1 |
| 5 | 2 | 2 | 0 |
| NONE | DISPLAY 3 | 3 | N/A |
| 6 | 4 | 4 | 0 |
| NONE | DISPLAY 5 | 5 | N/A |
| 7 | 6 | 6 | 0 |
| 8 | 7 | 7 | 0 |
| NONE | DISPLAY 8 | 8 | N/A |

FIG. 7

DYNAMIC MOTION VECTOR REFERENCING FOR VIDEO CODING

CROSS REFERENCE TO RELATED APPLICATION(S)

This disclosure is a continuation of U.S. application Ser. No. 15/677,220, filed Aug. 15, 2017, the disclosure of which is hereby incorporated by reference in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method according to an implementation of this disclosure comprises determining, using one or more syntax elements included in a bitstream representative of a video sequence, a frame offset value indicating a location of an encoded frame in a display order of the video sequence. A motion vector for inter-prediction of an encoded block of the encoded frame is determined using the frame offset value and a reference motion vector used to decode one or more reference frames of the encoded frame. A prediction block is generated for the encoded block using the motion vector. The encoded block is then decoded using the prediction block.

A method according to another implementation of this disclosure comprises determining a frame offset value indicating a location of an encoded frame in a display order of a video sequence. A prediction block for an encoded block of the encoded frame is generated using a motion vector determined using the frame offset value and a reference motion vector used to decode one or more reference frames of the encoded frame. The encoded block is then decoded using the prediction block.

A method according to yet another implementation of this disclosure comprises determining a motion vector for inter-prediction of an encoded block of an encoded frame using a frame offset indicating a location of the encoded frame in a display order of a video sequence and using a reference motion vector used to decode one or more reference frames of the encoded frame. The encoded block is then decoded using a prediction block generated using the motion vector.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

FIG. 7 is an illustration of an example of data used to indicate a display order of video frames of a video sequence.

DETAILED DESCRIPTION

Video compression schemes may include breaking respective images, or video frames, into smaller portions, such as video blocks, and generating an encoded bitstream using techniques to limit the information included for respective video blocks thereof. The encoded bitstream can be decoded to re-create the source images from the limited information. Encoding or decoding a video block can include predicting motion within that video block, such as with respect to one or more other video blocks in the same video frame or in a different video frame.

Predicting the motion within a video block is complicated by changes in the speed of motion, such as over multiple video frames in a video sequence. For example, an object moving between a series of consecutive frames may move more quickly between video frames of a first half of that series and more slowly between video frames of a second half of that series. Information indicating a display order of the video frames of that series may be useful in determining which of the video frames may be used to predict motion within a given video block; however, that information is not typically made available to a decoder. Furthermore, there may be multiple different directions of motion between those video frames such that it is typically difficult to effectively identify the possible motion vectors to use to predict motion of a video block and select the most optimal of those motion vectors for the prediction.

Implementations of this disclosure include using dynamic motion vector referencing to predict motion within video blocks of a video sequence to be encoded or decoded. The dynamic motion vector referencing selects one motion vector from a list of spatial and/or temporal motion vector candidates to predict motion within a video block. The motion vector candidates may be determined, for example, based on a motion trajectory indicated between one or more reference frames of the video sequence and a current frame including the video block to encode or decode.

The motion trajectory is determined based on a reference motion vector used for encoding or decoding one or more reference frames of the current frame. One or more temporal motion vector candidates are then determined for predicting motion within the video block based on the motion trajectory. A motion vector is selected from a motion vector candidate list including the one or more temporal motion vector candidates and used to generate a prediction block. The prediction block is then used to encode or decode the video block. The motion trajectory is based on an order of video frames indicated by frame offset values encoded to a bitstream. The motion vector candidate list may include one or more spatial motion vector candidates.

Figure 1:
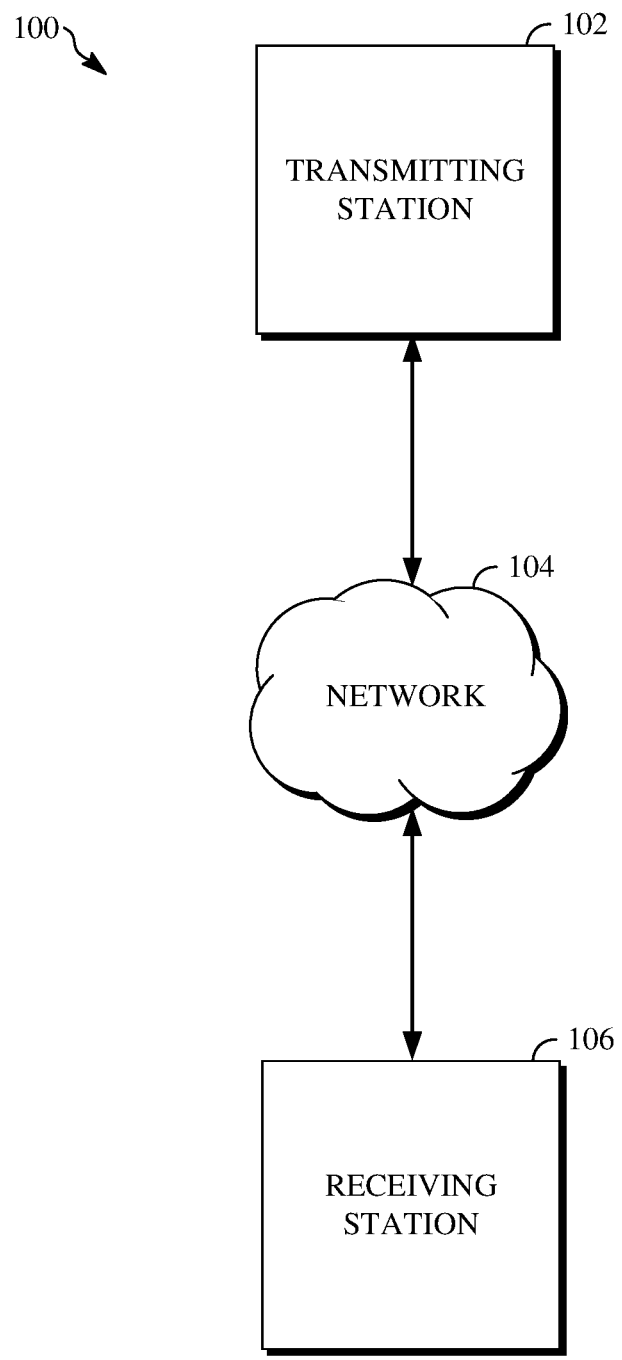
FIG. 1 is a schematic of a video encoding and decoding system.

Further details of techniques for video coding using frame rotation are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
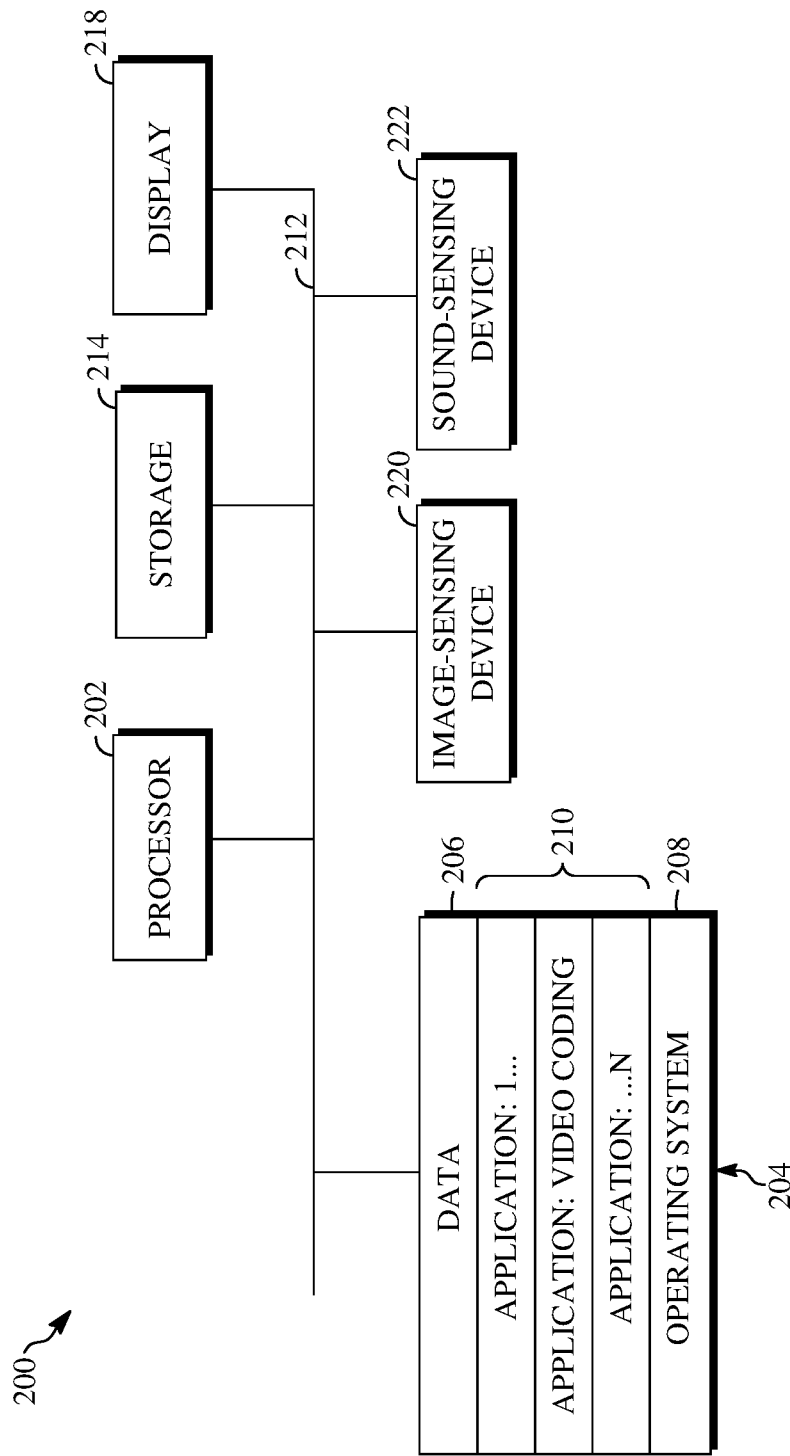
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
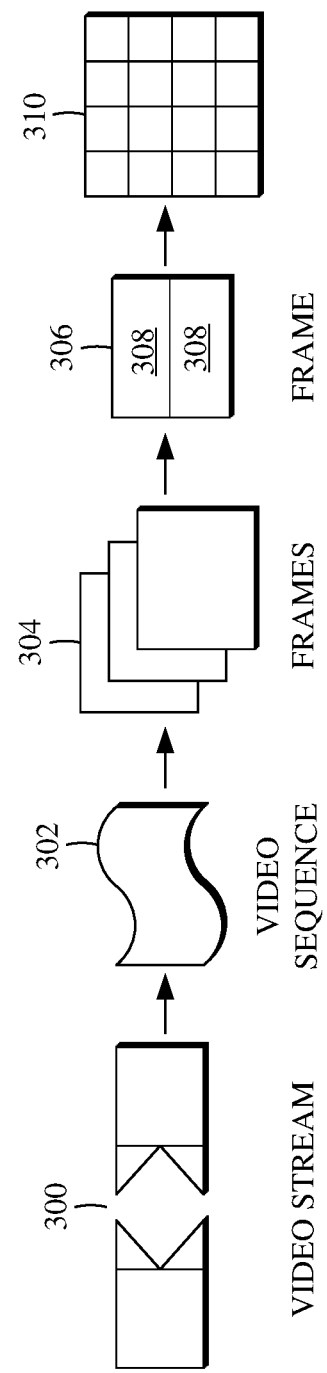
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
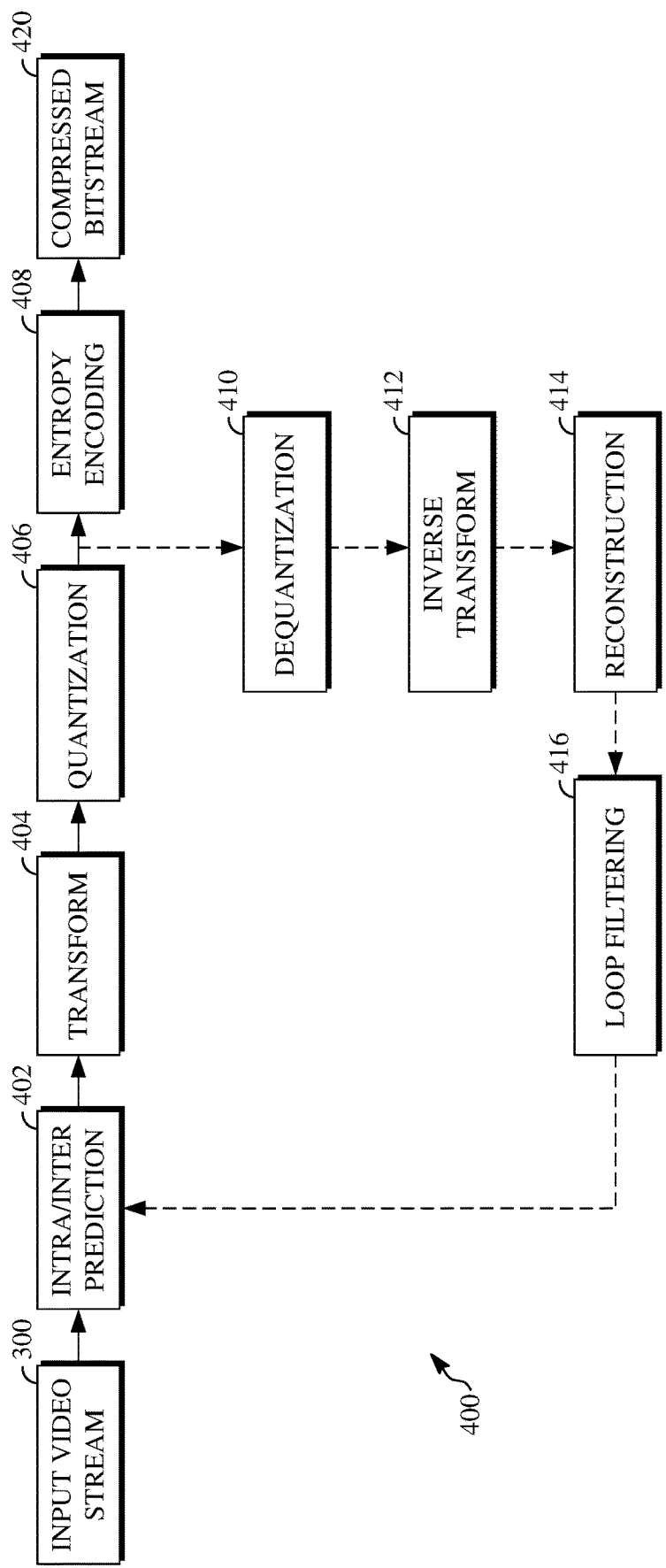
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
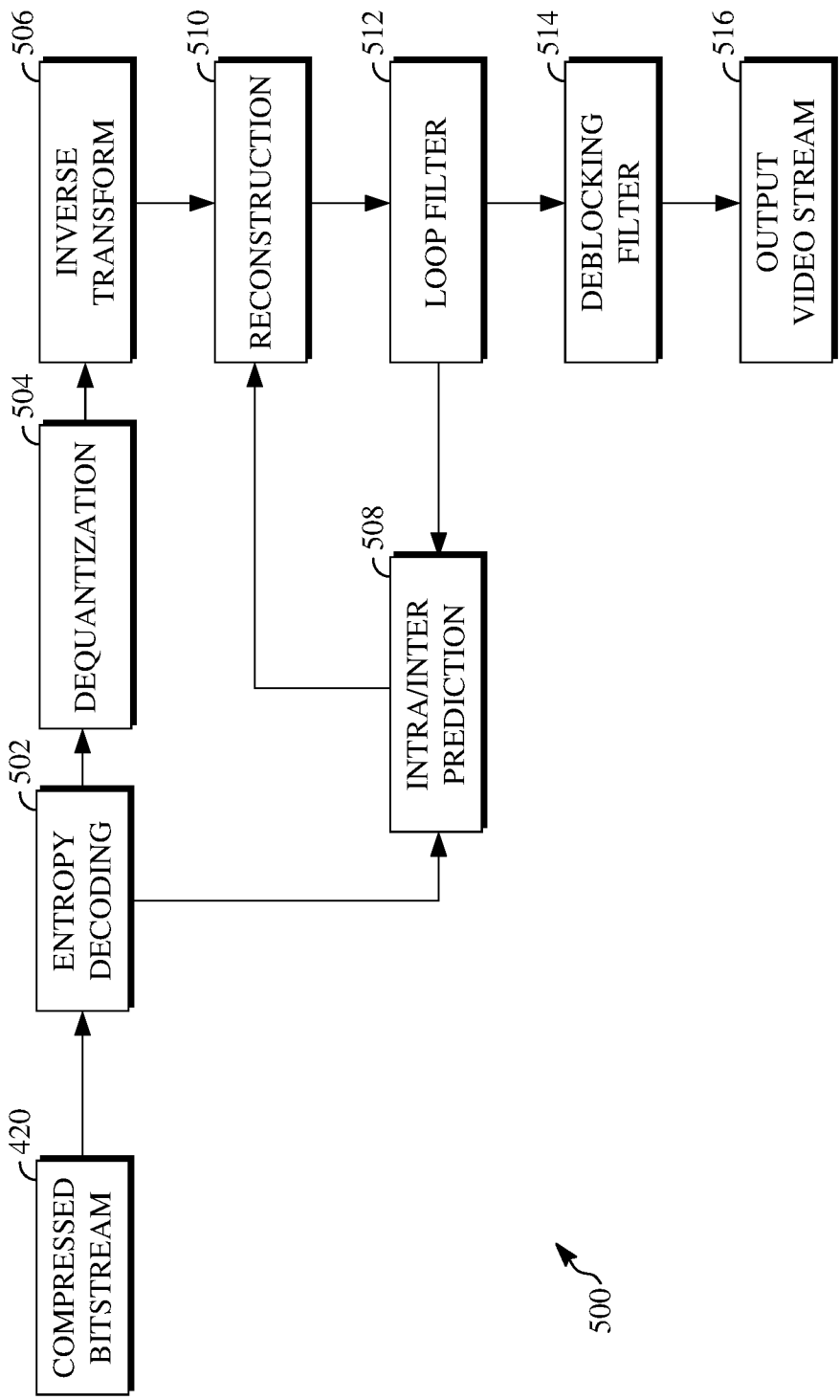
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6:
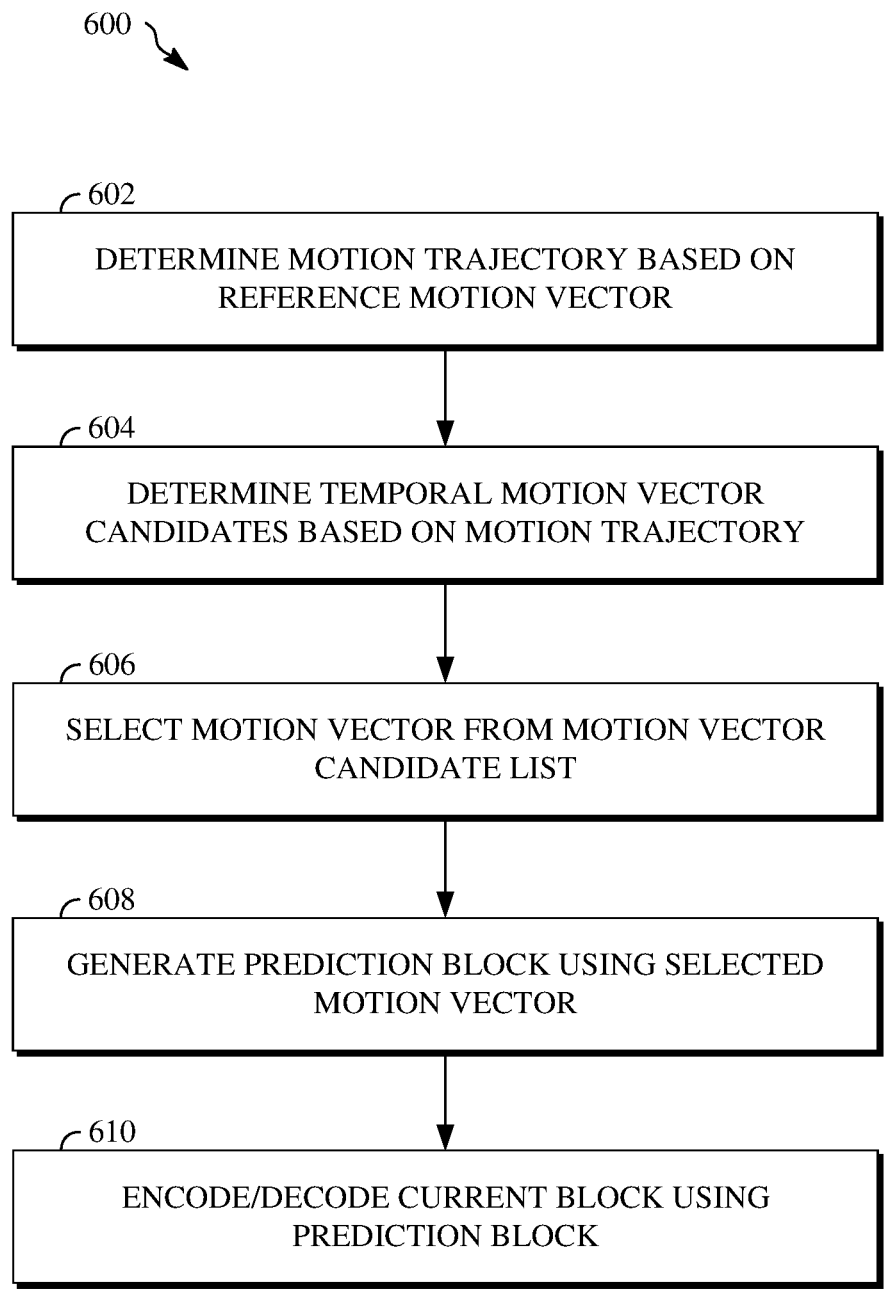
FIG. 6 is a flowchart diagram of an example of a technique for encoding or decoding a video block using dynamic motion vector referencing.

Techniques for encoding or decoding video blocks are now described with respect to FIG. 6. FIG. 6 is a flowchart diagram of an example of a technique 600 for encoding or decoding a video block using dynamic motion vector referencing. The technique 600 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 600. The technique 600 can be implemented using specialized hardware or firmware. As explained above, some computing devices may have multiple memories or processors, and the operations described in one or both of the technique 600 can be distributed using multiple processors, memories, or both.

For simplicity of explanation, the technique 600 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, a motion trajectory is determined. The motion trajectory is a trajectory of motion between video frames of a video sequence including a current video block to encode or decode. The motion trajectory can, for example, show the motion of an object from a first reference frame to a current video frame including the current video block, and then from the current video frame to a second reference frame, such as where the first reference frame is a past frame with respect to the current video frame (e.g., such that the second reference frame comes before the current video frame in a display order) or a future frame with respect to that current video frame (e.g., such that the second reference frame comes after the current video frame in the display order).

The motion trajectory indicates how one or more objects move or other motion occurs between the video frames based on a path of the motion from one of the video frames to one or more of the others. As such, the motion trajectory may be based on or otherwise indicative of a display order of the video sequence. The display order of the video sequence is known to an encoder performing the technique 600 based on the input video stream received by the encoder. However, a decoder performing the technique 600 does not receive an input video stream and therefore is not typically aware of the display order of the video sequence it decodes. Instead, the decoder receives an encoded bitstream indicating a coding order of the video sequence.

The display order and the coding order for a video sequence are typically different. For example, a display order for a video sequence including eight frames may be 1, 2, 3, 4, 5, 6, 7, and 8. However, a coding order for that video sequence may, for example, instead be 1, 5, 4, 6, 3, 7, 8, and 2, such as where a hierarchical framework is used for encoding and decoding the frames of the video sequence. As such, the encoder and the decoder may both know which reference frames of the video sequence are usable for encoding or decoding the current video block; however, without further information being provided to the decoder, the decoder cannot leverage information about the display order of the video sequence to decode the current video block.

Certain video frames included in the coding order may not be included in the display order. Such video frames, referred to as alternative reference frames, are decoded, but not displayed as part of an output video sequence. Instead, alternative reference frames remain in the reference frame buffer for use in predicting motion in video blocks of video frames that are output for display. An encoder may encode one or more syntax elements to a bitstream to indicate the locations of alternative reference frames in a coding order for a video sequence. A decoder can decode those one or more syntax elements to determine to use an alternative reference frame from the reference frame buffer rather than use a frame for display.

Data usable to determine the display order of the video sequence may be received by a decoder to determine the display order of the video sequence to decode the current video block. That data may include one or more frame offset values that indicate respective locations of video frames in a display order of a video sequence.

A frame offset value for a video frame is determined during encoding based on a frame index for that video frame and a number of packet stamps after which the video frame will be displayed. The frame index of a video frame reflects the location of that video frame in a display order, as known to the encoder (e.g., based on an input video stream received for encoding by the encoder). During an encoding operation, the encoder determines the frame indexes of the video frames in the video sequence being encoded. The first frame in the display order of the video sequence has an index of 1, and the Nth frame in that display order has an index of N. However, whereas the first frame in that is the first video frame to be encoded, the next video frame to be encoded may be a video frame located in the middle of the video sequence.

When a video frame is encoded to a bitstream, the data indicative of the encoded video frame can be stored in a packet. A packet includes information about one or more video frames of a video sequence. One of those video frames is a displayable video frame to be displayed subsequent to decoding using a decoder. The others of those video frames are reference frames used to decode the video frame to be displayed.

The number of jumps for a packet reflects the number of video frames that have to be decoded by a decoder in order to display the displayable video frame, such as by outputting the displayable video frame to an output video stream. For example, when a decoder receives a packet including N video frames, the decoder decodes the first N−1 video frames and uses those as reference frames for decoding the Nth video frame, which Nth video frame is then output for display. The number of packet stamps for a packet indicates the total number of video frames displayed after that packet has been decoded. The encoder can determine the number of packet stamps based on the number of reference frames used to encode a given video frame.

During encoding, subsequent to determining a frame index and a number of packet stamps for a video frame, the frame offset value is calculated as the difference between the frame index and the number of packet stamps. For example, for a video frame having a frame index of 1 and 1 packet stamp, the frame offset value is 0. In another example, for a video frame having a frame index of 8 and 2 packet stamps, the frame offset value is 6. In yet another example, for a video frame having a frame index of 2 and 2 packet stamps, the frame offset value is 0. Examples of relationships between frame indexes, numbers of packet stamps, and frame offset values are described below with respect to FIG. 7.

The motion trajectory is determined for the current video frame based on a reference motion vector used for coding one or more reference frames of the current video frame. For example, the reference motion vector may be a motion vector indicating or otherwise used to predict motion between one of reference frames usable to predict motion of the current video block and a reference frame used to encode or decode one or more video blocks in that one of the reference frames. For example, the order of those reference frames for predicting motion therebetween can be indicated to an encoder based on an input video stream and to a decoder based on frame offset values. Based on that order, a linear interpolation can be performed using the reference motion vector against a reference frame usable for encoding or decoding the current video block and a reference frame used for encoding or decoding that reference frame.

Performing the linear interpolation against those frames can include projecting a group of pixels of one reference frame from a location of that reference frame to a location within another reference frame. For example, a 4×4 or 8×8 block of pixels located at a position within a first reference frame can be projected to a position within a second reference frame. The first reference frame is a reference frame used to encode or decode one or more video blocks of the second reference frame, and the second reference frame is a reference frame usable to predict motion of the current video block. For example, the first reference frame may be a past frame and the second reference frame may be a future frame. There may be one or more other reference frames intermediate to the first reference frame and the current video frame. Examples of motion trajectories are described below with respect to FIGS. 8 and 9.

Determining the reference motion vector can include processing regions of a first reference frame usable to predict motion within the current video block. For example, processing the regions of the first reference frame can include comparing different groups of pixel values (e.g., 4×4 blocks, 8×8 blocks, or the like) of the first reference frame to same-dimensioned groups of pixel values in a second reference frame used to predict the motion of the first reference frame. For example, encoding or decoding a current frame may first include processing some or all 4×4, 8×8, or other-dimensioned blocks within some or all reference frames usable to predict motion within that current frame.

Subsequent to determining the reference motion vector, the reference motion vector is projected to the current video frame to determine where the motion trajectory fits within the current video frame. The location of the current video frame at which the motion trajectory fits the current video frame is the location of the current video block. For example, the row location of the current video block within the current video frame can be determined as Block_Row=RefMV.row*(1stRefFrame−CurrFrame)/(1stRefFrame−2ndRefFrame), and the column location of the current video block within the current video frame can be determined as Block_Col=RefMV.col*(1stRefFrame−CurrFrame)/(1stRefFrame−2ndRefFrame).

At 604, one or more temporal motion vector candidates are determined for predicting motion within the current video block based on the motion trajectory. The temporal motion vector candidates define a motion field estimate for current video block. The motion field estimate refers to the current video block and one or more other regions of the video frame including the current video block (e.g., 4×4, 8×8, or other-sized regions adjacent to or otherwise surrounding the current video block within the current video frame).

The motion field estimate includes one or more temporal motion vectors indicating motion between the current video frame, one or more first reference frames usable to predict motion of the current video block of the current video frame, one or more second reference frames usable to predict motion of video blocks of those one or more first reference frames, or the like, or a combination thereof. Each of the temporal motion vectors may, for example, refer to the motion of a group of N pixels (e.g., a 4×4 block, an 8×8 block, or the like) from a location in one video frame to a location in another video frame.

A temporal motion vector candidate is determined based on the location of the current video block, determined above using the reference motion vector. Determining the first temporal motion vector candidate includes performing a linear interpolation against a first reference frame and the current video frame based on the location of the current video block within the current video frame. The first temporal motion vector candidate may thus indicate a group of pixels in the first reference frame that show the object within the current video block. For example, the row location of the group of pixels in the first reference frame can be determined as Ref Block_Row=RefMV.row*(CurrFrame−1stRef- Frame)/(1stRefFrame−2ndRefFrame), and the column location of the group of pixels in the first reference frame can be determined as Ref Block_Col=RefMV.col*(CurrFrame−1stRefFrame)/(1stRefFrame−2ndRefFrame). Multiple temporal motion vector candidates can be determined in this way, such as based on the number of reference frames used.

At 606, a motion vector to use for encoding or decoding the current video block is selected. The selected motion vector is selected from a motion vector candidate list including the one or more temporal motion vector candidates determined based on the motion trajectory. Selecting the motion vector to use for the encoding or the decoding includes determining rate-distortion values resulting from predicting motion within the current video block using motion vector candidates of the motion vector candidate list. The motion vector candidates of the motion vector candidate list may, for example, include the one or more temporal motion vector candidates determined based on the motion trajectory.

A rate-distortion value refers to a ratio that balances an amount of distortion (e.g., a loss in video quality) with rate (e.g., a number of bits) for coding a block or other video component. The rate-distortion values may, for example, be determined by performing a rate-distortion analysis against ones of the temporal motion vector candidates of the motion vector candidate list (and/or other motion vector candidates as may be included in that list). As a result of the rate-distortion analysis, the one of the motion vector candidates used to determine a lowest one of the rate-distortion values is identified, such as by comparing respective ones of the rate-distortion values. That motion vector candidate is then selected as the selected motion vector.

The motion vector candidate list includes information indicative of the motion vector candidates usable to predict motion of the current video block. The motion vector candidate list may be a list stored or otherwise maintained in a buffer, table, database, or other data store or record, which list is updated whenever a new motion vector candidate is determined. Alternatively, the motion vector candidate list may be created subsequent to the determination of a first motion vector candidate and deleted subsequent to the selection of the selected motion vector.

At 608, a prediction block is generated using the selected motion vector. The prediction block can include pixel values indicating a prediction of the motion of the current video block according to the selected motion vector. Generating the prediction block can include generating a prediction residual based on a difference between pixel values of the current video block and pixel values of the prediction block. For example, during operations for encoding the current video block, the prediction residual can be generated using operations performed by the encoder 400 shown in FIG. 4 (e.g., at the intra/inter prediction stage 402). In another example, during operations for decoding the current video block, the prediction residual can be generated using operations performed by the decoder 500 shown in FIG. 5 (e.g., at the intra/inter prediction stage 508).

At 610, the current video block is encoded or decoded using the prediction block. For example, operations for encoding the current video block using the prediction block can include transforming, quantizing, and entropy encoding the prediction residual to an encoded bitstream (e.g., the compressed bitstream 420 shown in FIG. 4). In another example, operations for decoding the current video block using the prediction block can include reconstructing the video block based on the prediction residual, filtering the reconstructed video block, and outputting the filtered video block to a video stream (e.g., the output video stream 516 shown in FIG. 5).

In some implementations, the technique 600 includes determining one or more spatial motion vector candidates based on one or more neighbor blocks of the current block. For example, the one or more spatial motion vector candidates can include one or more motion vectors determined using intra-prediction. For example, where the blocks of the video frame including the current video block are scanned in a raster order, a spatial motion vector candidate can be determined based on motion predicted using an above-neighbor block of the current video block, a left-neighbor block of the current video block, or the like, or a combination thereof.

The one or more spatial motion vector candidates may be organized into two different categories. A first category includes spatial motion vector candidates determined using one or more neighbor blocks immediately adjacent to the current video block. A second category includes spatial motion vector candidates determined using one or more neighbor blocks surrounding, but not immediately adjacent to, the current video block. For example, a spatial motion vector candidate in the second category may be derived using a block that is two blocks away from the current video block.

Spatial motion vectors in the first category may be prioritized over those in the second category. For example, if two different spatial motion vector candidates may both result in the same performance for predicting motion in the current video block, but each was from a different one of the two categories, the spatial motion vector candidate of the first category would be selected over the other.

The one or more spatial motion vector candidates may be included in the motion vector candidate list that includes the one or more temporal motion vector candidates determined based on the motion trajectory. As such, in such an implementation, selecting the motion vector from the motion vector candidate list can include performing a rate-distortion analysis against one or more temporal motion vector candidates and one or more spatial motion vector candidates and selecting one of the temporal motion vector candidates or the spatial motion vector candidates as the selected motion vector.

In some implementations, the technique 600 includes encoding one or more syntax elements to a bitstream to which the current block is encoded. For example, when the technique 600 is performed during operations for encoding a current video block, the one or more syntax elements encoded to the bitstream may indicate of the selected motion vector, a display order of a video sequence including the current frame and the one or more reference frames, or the like, or a combination thereof. The one or more syntax elements may, for example, be encoded to a frame header of the current frame including the current video block. For example, the one or more syntax elements used to indicate the display order of the video sequence can include four, five, or some other number of bits for indicating frame offset values of the video frames of the video sequence.

In another example, the one or more syntax elements used to indicate the selected motion vector can include a number of bits for indicating a location within a reference frame of a block of pixels corresponding to the selected motion vector, an index of the selected motion vector within the motion vector candidate list, or the like, or a combination thereof. The number of bits can be based on the total number of motion vector candidates included in the motion vector candidate list. For example, when the motion vector candidate list includes two candidates, one bit can be used to indicate the selected motion vector (e.g., where each of the motion vector candidates is associated with one of the values of the bit, or by using a value of 1 to indicate the location of the block of pixels including the motion indicated by the selected motion vector). In another example, when the motion vector candidate list includes two candidates, two bits can be used.

Alternatively, the one or more syntax elements used to indicate the selected motion vector can indicate context information associated with the selected motion vector. For example, when the selected motion vector is a spatial motion vector, the one or more syntax elements may indicate whether that selected motion vector was derived from an above-neighbor block, a left-neighbor block, or a block surrounding but not immediately adjacent to the current video block. In another example, the one or more syntax elements may indicate whether the selected motion vector was derived from a first category of spatial motion vector candidates or a second category of spatial motion vector candidates.

At least one of the one or more syntax elements indicates a frame offset value for the current frame, which frame offset value indicates a location of the current frame in a video sequence. For example, the syntax elements indicating the frame offset value can include a number of bits based on the number of look-ahead frames used by the encoder and decoder. For example, when the number of look-ahead frames is 16, four bits may be used to indicate the frame offset value. In another example, when the number of look-ahead frames is 32, five bits may be used to indicate the frame offset value.

In some implementations, the technique 600, when performed during operations for decoding a current video block, includes decoding one or more syntax elements from a bitstream including an encoded frame to decode. For example, the one or more syntax elements decoded from the bitstream may indicate a frame offset value for the encoded video frame. In another example, the one or more syntax elements decoded from the bitstream may indicate a motion vector selected for encoding the encoded block during operations for encoding the block.

In some implementations, the technique 600 can include determining that the motion vector selected during the operations for decoding the video block corresponds to the motion vector indicated by the one or more decoded syntax elements. For example, subsequent to selecting a motion vector for predicting motion within a current video block to decode, the motion vector indicated within the bitstream can be compared to the selected motion vector. The comparing may include comparing motion vector indexes for each of the selected and indicated motion vectors, comparing blocks of pixels at locations within one or more reference frames as indicated by each of the selected and indicated motion vectors, or the like, or a combination thereof.

In some implementations, selecting the motion vector during decoding operations can include determining multiple motion vector candidates (e.g., temporal and/or spatial) and then comparing the determined motion vector candidates to the motion vector indicated in a bitstream including the encoded block and encoded video frame. For example, responsive to identifying that one of the determined motion vector candidates is the motion vector indicated in the bitstream, the decoder can select that identified motion vector candidate.

In some implementations, the technique 600 includes updating a probability model associated with the video frame or the video sequence to indicate the motion vector selected for predicting the motion of the current video block. For example, the probability model can be updated to reflect the probability of a particular motion vector (e.g., based on index), a particular type of motion vector (e.g., temporal or spatial), or context information for the motion vector (e.g., a neighbor block associated with the motion vector) being selected. Each of the encoder and decoder can maintain their own probability models.

In some implementations, motion vectors other than the one or more temporal motion vector candidates or the one or more spatial motion vector candidates may be included in the motion vector candidate list. For example, the motion vector candidate list can include the reference motion vector used to determine the motion trajectory. In another example, the motion vector candidate list can include a motion vector used to predict a collocated block within a neighbor video frame of the current video frame.

FIG. 7 is an illustration of an example of data used to indicate a display order of video frames of a video sequence. In particular, a table 700 includes a coding order, a frame index, a number of packet stamps, and a frame offset value for each of a plurality of video frames of a video sequence to encode or decode. The coding order includes spaces between codings of frames, such as between 5 and 6 and after 8. These spaces indicate when an alternative reference frame is encoded or decoded, as applicable. The frame index indicates the alternative reference frame used for those spaces. For example, the video frame located 3rd in the display order of the video sequence is encoded or decoded, as applicable, between 5 and 6 in the coding order. There is no frame offset value for these spaces since there is no video frame to display.

Figure 8:
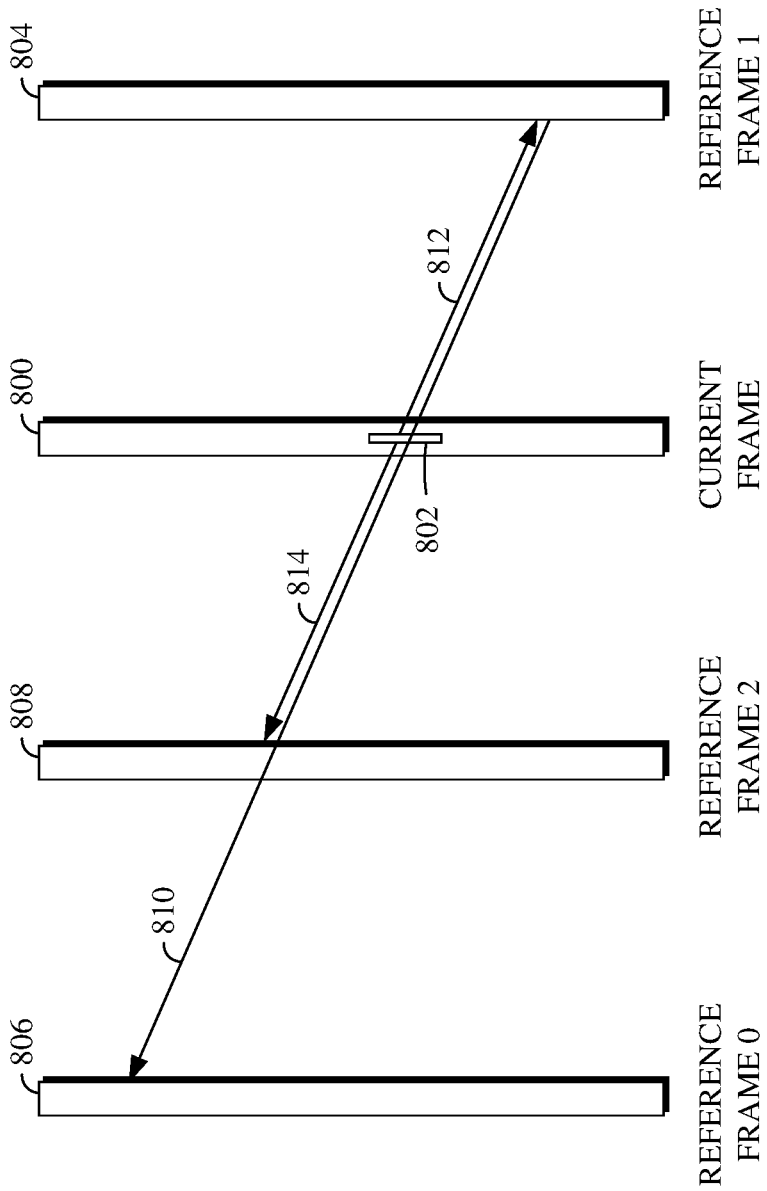
FIG. 8 is a diagram of an example of using a motion trajectory for a current frame to predict motion of a current block.

FIG. 8 is a diagram of an example of using a motion trajectory for a current frame 800 to predict motion of a current block 802. The motion trajectory shows motion between the current frame 800 and three reference frames 804, 806, and 808. The motion trajectory is determined based on a reference motion vector 810, which indicates motion between the reference frame 0 806 and the reference frame 1 804. For example, the reference frame 0 806 may be a reference frame used to predict motion of one or more blocks of the reference frame 804. After the reference motion vector 810 is determined, the motion trajectory is determined as the trajectory corresponding to the direction of the reference motion vector 810.

The motion trajectory identifies the current block 802 as the location of the current frame 800 intersected by the motion trajectory. A first temporal motion vector candidate 812 may then be determined as indicating motion between the reference frame 1 804 and the current frame 800. A second temporal motion vector candidate 814 may be determined as indicating motion between the reference frame 2 808 and the current frame 800. One or more of the reference motion vector 810, the first temporal motion vector candidate 812, or the second temporal motion vector candidate 814 may be included in a motion vector candidate list from which a motion vector is selected for predicting motion of the current block 802.

The reference frame 0 806 and the reference frame 2 808 are shown as past frames with respect to the current frame 800. The reference frame 1 804 is shown as a future frame with respect to the current frame 800. However, other numbers of past or future reference frames may be used. For example, a motion trajectory can be determined where there is one past reference frame and one future reference frame. In another example, a motion trajectory can be determined where there is one past frame and two future reference frames. In another example, a motion trajectory can be determined where there are two or more past reference frames and two or more future reference frames.

Figure 9:
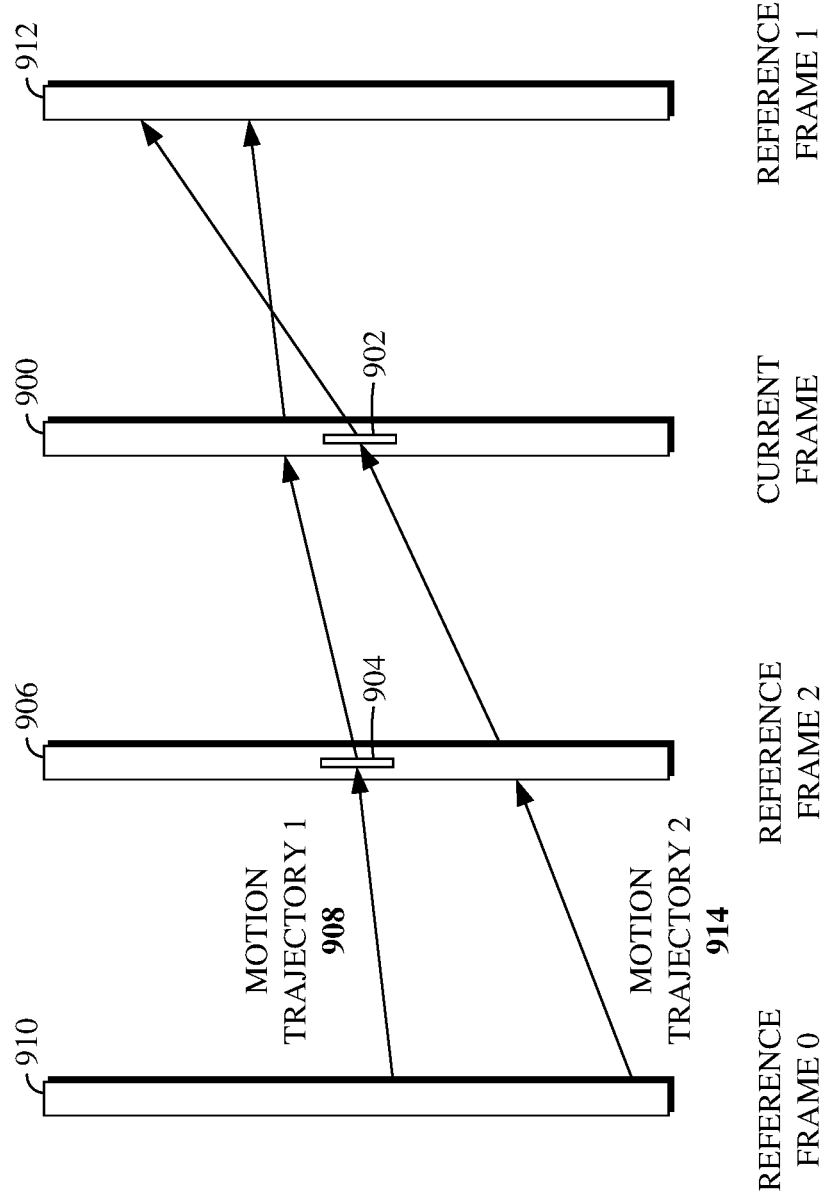
FIG. 9 is a diagram of an example of using multiple motion trajectories to predict motion of a current block.

FIG. 9 is a diagram of an example of using multiple motion trajectories to predict motion of a current block. The motion trajectory shown in and described with respect to FIG. 8 has a constant slope from the past-most reference frame to the future-most reference frame and thus indicates that the motion between the video frames thereof occurs at a constant rate. However, this may not always be the case, such as where motion speeds up or slows down between video frames.

A current frame 900 includes a current block 902 to encode or decode. When the motion is very slow, a collocated block 904 at a preceding reference frame 2 906 may be used to predict motion of the current block 902. However, if the motion is not slow enough, the corresponding motion trajectory may not intersect the current block 902 such that the collocated block 904 may not be used. For example, a first motion trajectory 908 from a past-most reference frame 0 910 to a future-most reference frame 1 912 intersects the current frame 900 slightly above the current block 902.

In such a case, a motion field estimate for the current block 902 can be used, such as to identify motion from the collocated block 904 within an extended region of the current block 902 (e.g., a group of one or more 4×4, 8×8, or other-dimensioned blocks surrounding the current block 902 within the current frame 900). For example, the extended region may be defined based on the locations within the current frame 900 of objects from one or more of the reference frames 906, 910, 912, such as where the motion of those objects is indicated using one or more temporal motion vector candidates.

The motion field estimate may, for example, reflect the locations of all motion within the current frame 900 with respect to the available reference frames. For example, the motion field estimate may be used to determine a second motion trajectory 914 from the reference frame 0 910 to the reference frame 1 912. The second motion trajectory 914 intersects the current frame 900 at the current block 902. As such, a motion vector candidate associated with the second motion trajectory 914 may more accurately predict motion of the current block 902 itself than a motion vector candidate associated with the first motion trajectory 908.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
decoding one or more syntax elements representative of a frame offset value for an encoded frame from a bitstream representative of a video sequence, wherein the frame offset value indicates a location of the encoded frame in a display order of the video sequence and is based on a frame index of the encoded frame and a number of packet stamps for the encoded frame, wherein the number of packet stamps indicates a total number of video frames of the video sequence which are output for display after a packet associated with the encoded frame is decoded;
determining a motion vector for inter-prediction of an encoded block of the encoded frame using the frame offset value and a reference motion vector used to decode one or more reference frames of the encoded frame;
generating a prediction block for the encoded block using the motion vector; and
decoding the encoded block using the prediction block.

2. The method of claim 1, wherein the frame index is based on an input video stream encoded to the bitstream and the number of packet stamps is based on a number of reference frames used to encode the encoded frame.

3. The method of claim 2, wherein frame offset values are encoded for display frames only, wherein the number of reference frames includes a number of non-display frames used to encode the encoded frame.

4. The method of claim 1, wherein determining the motion vector using the frame offset value and the reference motion vector comprises:
determining, using the frame offset value and the reference motion vector, a motion trajectory between a first reference frame of the one or more reference frames, the encoded frame, and a second reference frame of the one or more reference frames;
determining one or more motion vector candidates for the inter-prediction of the encoded block using the motion trajectory; and
selecting one of the one or more motion vector candidates as the motion vector.

5. The method of claim 4, wherein, when a speed of a motion associated with the motion trajectory increases or decreases between frames, determining the motion trajectory between the first reference frame, the encoded frame, and the second reference frame comprises:
using a motion field estimate for the encoded block to identify, within an extended region of the encoded block, a motion of a co-located block of the first reference frame or the second reference frame.

6. The method of claim 5, wherein the motion trajectory is a first motion trajectory, the method further comprising:
determining a second motion trajectory between the first reference frame, the encoded frame, and the second reference frame using the motion field estimate, wherein the second motion trajectory intersects the encoded frame at the encoded block, and wherein the one or more motion vector candidates are determined using the second motion trajectory.

7. The method of claim 4, wherein the first reference frame is located before the encoded frame in the display order and the second frame is located after the encoded frame in the display order.

8. The method of claim 4, wherein determining the motion trajectory between the first reference frame, the encoded frame, and the second reference frame comprises:
performing a linear interpolation against the first reference frame and a reference frame used for decoding the first reference frame using the reference motion vector.

9. The method of claim 8, wherein the linear interpolation is a first linear interpolation, and wherein determining the one or more motion vector candidates for the inter-prediction of the encoded block using the motion trajectory comprises:
performing a second linear interpolation against the first reference frame and the encoded frame along the motion trajectory to determine a motion vector candidate of the one or more motion vector candidates.

10. A method, comprising:
decoding one or more syntax elements representative of a frame offset value for an encoded frame from a bitstream representative of a video sequence, wherein the frame offset value indicates a location of the encoded frame in a display order of the video sequence and is based on a frame index of the encoded frame and a number of packet stamps for the encoded frame, and wherein the number of packet stamps indicates a total number of video frames of the video sequence which are output for display after a packet associated with the encoded frame is decoded;
generating a prediction block for an encoded block of the encoded frame using a motion vector determined using the frame offset value and a reference motion vector used to decode one or more reference frames of the encoded frame; and
decoding the encoded block using the prediction block.

11. The method of claim 10, wherein the frame index is based on an input video stream encoded to the bitstream to which the encoded frame is written and the number of packet stamps is based on a number of reference frames used to encode the encoded frame.

12. The method of claim 11, wherein frame offset values are encoded for display frames only, and wherein the number of reference frames includes a number of non-display frames used to encode the encoded frame.

13. The method of claim 10, further comprising:
determining, using the frame offset value and the reference motion vector, a motion trajectory between a first reference frame of the one or more reference frames, the encoded frame, and a second reference frame of the one or more reference frames;
determining one or more motion vector candidates for inter-prediction of the encoded block using the motion trajectory; and
selecting one of the one or more motion vector candidates as the motion vector.

14. The method of claim 13, wherein, when a speed of a motion associated with the motion trajectory increases or decreases between frames, determining the motion trajectory between the first reference frame, the encoded frame, and the second reference frame comprises:
using a motion field estimate for the encoded block to identify, within an extended region of the encoded block, a motion of a co-located block of the first reference frame or the second reference frame.

15. The method of claim 14, wherein the motion trajectory is a first motion trajectory, the method further comprising:
determining a second motion trajectory between the first reference frame, the encoded frame, and the second reference frame using the motion field estimate, wherein the second motion trajectory intersects the encoded frame at the encoded block, and wherein the one or more motion vector candidates are determined using the second motion trajectory.

16. A method, comprising:
determining a motion vector for inter-prediction of an encoded block of an encoded frame using a frame offset value indicating a location of the encoded frame in a display order of a video sequence and using a reference motion vector used to decode one or more reference frames of the encoded frame, wherein the frame offset value is represented by one or more syntax elements decoded from a bitstream representative of the video sequence and is based on a frame index of the encoded frame and a number of packet stamps for the encoded frame, and wherein the number of packet stamps indicates a total number of video frames of the video sequence which are output for display after a packet associated with the encoded frame is decoded; and
decoding the encoded block using a prediction block generated using the motion vector.

17. The method of claim 16, wherein the frame index is based on an input video stream encoded to the bitstream to which the encoded frame is written, and the number of packet stamps is based on a number of reference frames used to encode the encoded frame.

18. The method of claim 17, wherein frame offset values are encoded for display frames only, and the number of reference frames includes a number of non-display frames used to encode the encoded frame.

19. The method of claim 16, wherein determining the motion vector using the frame offset value and the reference motion vector comprises:
determining, using the frame offset value and the reference motion vector, a motion trajectory between a first reference frame of the one or more reference frames, the encoded frame, and a second reference frame of the one or more reference frames;
determining one or more motion vector candidates for the inter-prediction of the encoded block using the motion trajectory; and
selecting one of the one or more motion vector candidates as the motion vector.

20. The method of claim 16, wherein the frame offset value is a difference between the frame index and the number of packet stamps.

* * * * *